No. 819,656. PATENTED MAY 1, 1906

W. HÖPFLINGER & E. SACHS.
BALL BEARING.
APPLICATION FILED AUG. 2, 1905.

Witnesses:
Mary E. Kufer.
Ida M. Lauber.

Inventors:
Wilhelm Höpflinger
Ernst Sachs
By Julian C. Dowell
their atty

UNITED STATES PATENT OFFICE.

WILHELM HÖPFLINGER AND ERNST SACHS, OF SCHWEINFURT, GERMANY.

BALL-BEARING.

No. 819,656.     Specification of Letters Patent.     Patented May 1, 1906.

Application filed August 2, 1905. Serial No. 272,412.

*To all whom it may concern:*

Be it known that we, WILHELM HÖPFLINGER, residing at No. 3 Cramer street, and ERNST SACHS, residing at No. 5 Schultes street, Schweinfurt, Germany, subjects of the King of Bavaria, have invented certain new and useful Improvements in Ball-Bearings, of which the following is a specification.

This invention relates to ball-bearings of that class in which the balls run in the annular confronting ball-races of concentric bearing-rings.

The invention provides an improved construction having a ball cage or separator in which the balls are arranged closely together, occupying nearly the whole capacity of the bearing, and are spaced by and inclosed in opposite spherical cavities formed in solid-metal divider-rings, which rings are arranged at opposite sides of the balls and substantially close the annular space or interstice between the bearing-rings, said divider-rings being firmly connected together. The construction is such that the bearing can be filled up with the full number of balls which it is able to hold, less one ball, the balls being held only at slight distances apart, so that the greatest capacity of the bearing is obtained, and yet frictional contact of the balls against each other is prevented and deviation of the balls out of the races is avoided, and a smooth noiseless running of the bearing is obtained. The solid divider-rings, filling the interstices between the bearing-rings, cover the balls and avoid entrance of grit or dust to the bearing, and the walls of the spherical cavities being thin at the inner sides of the rings and considerably increasing in thickness toward the outer sides of said rings provide bearing-surfaces of adequate strength to take the pressure of the balls.

The invention is illustrated in practical form in the accompanying drawings, wnich form a part of this specification.

Figure 1:
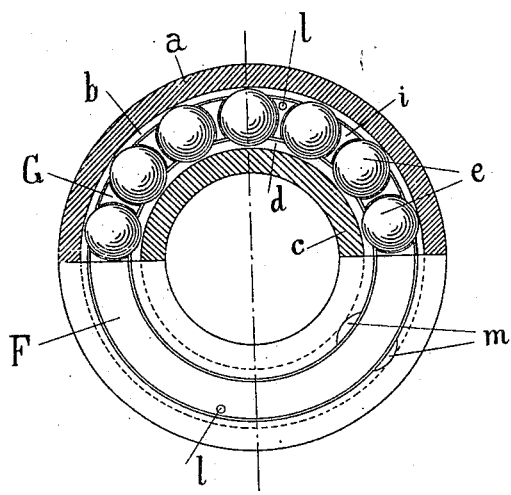
Figure 2:
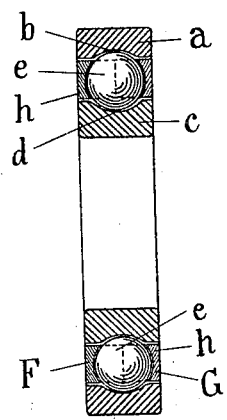
Figure 3:
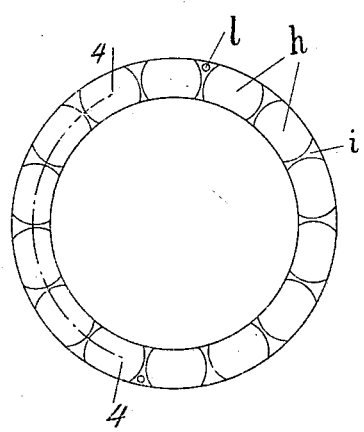
Figure 4:
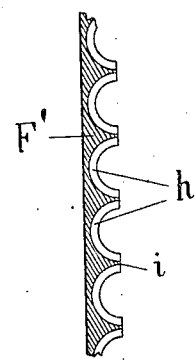

Figure 1 is a view, half in front elevation and half in section, of the ball-bearing. Fig. 2 is a central vertical cross-section of the same. Fig. 3 is a front view of one of the divider-rings looking at the inner face or side thereof. Fig. 4 is a development of a section on line 4 4 of Fig. 3 spread out open.

The ball-bearing illustrated in the drawings comprises two concentric rings $a$ and $c$, of hardened steel. The outer ring $a$ has an annular groove $b$ in its inner periphery, and the inner ring $c$ has a confronting groove $d$ in its outer periphery, which grooves form the ball-races for the interposed series of balls $e$. The ball separator or cage comprises two divider-rings F and G, of solid metal, arranged in and closing the interstice between the bearing-rings at opposite sides of the balls, said divider-rings being rigidly connected together, with their inner faces in contact, and having opposed spherical cavities $h$, each conforming to a half-ball, the balls being seated and closed in such cavities, and thereby spaced and held in proper position. The spherical cavities or ball-pockets $h$ are formed in the inner faces of the divider-rings by grinding, milling, or the like. These cavities are arranged very closely together, it being observed from the drawings that the walls $i$ between adjacent cavities are quite thin at the middle of the bearing and increase considerably in thickness toward the outer sides, so that a relatively large quantity of balls are employed, arranged closely together and yet sufficiently separated to avoid contact, while the spherical chambers formed by the united divider-rings encircle those parts of the balls not contained in the ball-races, providing larger bearing-surfaces, whose walls increase outwardly in thickness and strength, so that the thrust and pressure of the balls is largely taken by the thick portions of the metal. The balls $e$ are first introduced in the well-known manner through lateral openings or the like between bearing-rings, as indicated at $m$ in Fig. 1. The ball-races are filled up with the full number of balls which the bearing is able to contain, less one ball. After the balls have been slipped between the bearing-rings the divider-rings are inserted in opposite sides of the bearing, thereby spacing the balls in the respective chambers formed by the opposed cavities of the divider-rings, and said divider-rings are then firmly connected by rivets $l$, screws, or the like. Since the outer surfaces of the divider-rings are in the same planes as the outer surfaces of the bearing, the appliance is very close, and the interior of the bearing is protected from disturbance through external influences. By this invention the frictional contact of the balls is prevented in the simplest manner and a quiet and noiseless running of the bearing is secured.

Having thus fully described our invention, what we claim as new, and desire to secure by Letters Patent of the United States, is—

A ball-bearing comprising, in combination, concentric bearing-rings separated by an annular space or interstice and having confronting grooves or ball-races in their adjacent peripheries, an interposed series of closely-disposed balls arranged in and between said ball-races, and a ball-separator comprising two divider-rings of solid metal arranged in and closing the space or interstice between the bearing-rings at opposite sides of the balls and rigidly connected together with their inner faces in contact and having opposed spherical cavities formed in said contacting faces, which cavities provide closed chambers inclosing those parts of the balls not contained in the ball-races, the walls between adjacent cavities being relatively thin and increasing in thickness outwardly, and the outside faces of said divider-rings being closed or continuous and flush with the sides of the bearing-rings.

In testimony whereof we have signed our names to this specification in the presence of two subscribing witnesses.

WILHELM HÖPFLINGER.
ERNST SACHS.

Witnesses:
H. BARDEL,
E. WENGLER.